(12) United States Patent
Shigeno

(10) Patent No.: US 9,848,099 B2
(45) Date of Patent: Dec. 19, 2017

(54) LIQUID MANAGEMENT STRUCTURES FOR AN IMAGE READING APPARATUS

(71) Applicant: Brother Kogyo Kabushiki Kaisha, Nagoya-shi, Aichi-ken (JP)

(72) Inventor: Hiroaki Shigeno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/080,644

(22) Filed: Mar. 25, 2016

(65) Prior Publication Data

US 2016/0295047 A1 Oct. 6, 2016

(30) Foreign Application Priority Data

Mar. 30, 2015 (JP) ................................. 2015-068089

(51) Int. Cl.
*H04N 1/00* (2006.01)
*G03G 21/00* (2006.01)
(Continued)

(52) U.S. Cl.
CPC ..... *H04N 1/00907* (2013.01); *G03G 21/1652* (2013.01); *H04N 1/00559* (2013.01); *H04N 1/00795* (2013.01); *H04N 1/10* (2013.01); *G03G 2221/166* (2013.01); *H04N 2201/0094* (2013.01)

(58) Field of Classification Search
CPC ............... G03G 15/60; G03G 21/1652; G03G 21/1666; G03G 2215/00198; G03G 2221/1636; G03G 2221/166; H04N 1/00795; H04N 1/10; H04N 1/00559; H04N 2201/0094; H04N 1/1065; H04N 1/00907;
(Continued)

(56) References Cited

U.S. PATENT DOCUMENTS 7,855,814 B2 * 12/2010 Osakabe ............ H04N 1/00519
358/474
8,081,354 B2 * 12/2011 Okada .................. H04N 1/1013
174/535
(Continued)

FOREIGN PATENT DOCUMENTS

| JP | 2003-167302 A | 6/2003 |
|---|---|---|
| JP | 2007-228529 A | 9/2007 |
| JP | 2011-205341 A | 10/2011 |
| JP | 2011-234030 A | 11/2011 |
| JP | 2014-120864 A | 6/2014 |

*Primary Examiner* — Robert Beatty
(74) *Attorney, Agent, or Firm* — Banner & Witcoff, Ltd.

(57) ABSTRACT

An image reading apparatus includes a reading device having an opening in an upper surface thereof, a main device disposed below the reading device, a first cable connected to the reading device and the main device and including a first portion, a retaining portion disposed in the main device, and a groove portion. The retaining portion is configured to retain the first portion of the first cable such that the first portion has a substantially U-shaped curve, which is curved downwardly, and such that a liquid passes through the opening of the reading device, runs on the first portion downwardly and drops down from a lower end of the substantially U-shaped curve in the first portion of the first cable. The groove portion is configured to receive the liquid dropping down from the lower end of the substantially U-shaped curve in the first portion of the first cable.

15 Claims, 13 Drawing Sheets

(51) Int. Cl.
*H04N 1/10* (2006.01)
*G03G 21/16* (2006.01)

(58) Field of Classification Search
CPC ............. H04N 1/04; H04N 2221/0081; H04N 2201/0081
USPC ........ 399/107, 365; 358/494, 496, 497, 300, 358/302; 174/72 A, 97, 99 R, 100
See application file for complete search history.

(56) References Cited

U.S. PATENT DOCUMENTS

| | | | |
|---|---|---|---|
| 8,270,045 B2 * | 9/2012 | Iwata | G03G 15/605 16/21 |
| 9,204,001 B2 | 12/2015 | Shiomi | |
| 2003/0103781 A1 | 6/2003 | Takahashi et al. | |
| 2004/0056926 A1 * | 3/2004 | Samoto | B41J 29/02 347/50 |
| 2004/0238199 A1 * | 12/2004 | Yamanaka | G03G 21/1652 174/68.1 |
| 2007/0201109 A1 | 8/2007 | Osakabe et al. | |
| 2011/0235139 A1 * | 9/2011 | Kurokawa | G03G 15/60 358/498 |
| 2011/0235140 A1 | 9/2011 | Ito et al. | |
| 2014/0009799 A1 * | 1/2014 | Miura | H04N 1/00551 358/474 |
| 2014/0168680 A1 | 6/2014 | Shiomi | |
| 2016/0227059 A1 * | 8/2016 | Nakamura | H04N 1/00559 |

* cited by examiner

LIQUID MANAGEMENT STRUCTURES FOR AN IMAGE READING APPARATUS

CROSS-REFERENCE TO RELATED APPLICATION

This application claims priority from Japanese Patent Application No. 2015-068089, filed on Mar. 30, 2015, which is incorporated herein by reference in its entirety.

TECHNICAL FIELD

The disclosure relates to an image reading apparatus.

BACKGROUND

A known image reading apparatus includes a reading device, a main device, and an electrical cable. The reading device accommodates a reading unit for reading an image from a document and a drive unit including a motor related to driving of the reading unit. The main device is disposed below the reading device and accommodates electrical components such as a control board. The cable is connected at one end to the drive unit and at the other end to an electrical component of the main device. An intermediate portion of the cable extends from the reading device to the main device.

SUMMARY

For example, a liquid may spill on the image reading apparatus from above and enter the reading device. If such a case happens, the liquid may run from the intermediate portion of the cable down to the other end thereof and reach the electrical component, and the electrical component may be subject to damage.

Accordingly, some embodiments of the disclosure provide for an image reading apparatus which can reduce or prevent liquid from reaching an electrical component in a main device and thus may reduce or prevent damage to an electrical component of the main device.

According to an aspect of the disclosure, an image reading apparatus includes a reading device, a main device, a first cable, a retaining portion, and a groove portion. The reading device has an opening defined in an upper surface of the reading device. The reading device includes a reading unit configured to read an image from a document and a drive unit configured to drive the reading unit. The reading unit and the drive unit are disposed below the upper surface of the reading device. The main device is disposed below the reading device and includes an electronic component. The first cable extends below the opening of the reading device. The first cable is connected at one end to the drive unit of the reading device and at the other end to the electronic component of the main device. The first cable includes a first portion. The retaining portion is disposed in the main device and configured to retain the first portion of the first cable at a position spaced from the electronic component such that the first portion has a substantially U-shaped curve, which is curved downwardly, and such that a liquid passes through the opening of the reading device, runs on the first portion downwardly and drops down from a lower end of the substantially U-shaped curve in the first portion of the first cable. The groove portion is disposed below the lower end of the substantially U-shaped curve in the first portion of the first cable retained by the retaining portion. The groove portion is configured to receive the liquid dropping down from the lower end of the substantially U-shaped curve in the first portion of the first cable.

In the image reading apparatus, the first portion in the intermediate portion of the first cable is retained by the retaining portion disposed in the main device at a location away from the electrical component to have substantially a U-shaped curve in the first portion. Thus, if liquid spills on the image reading apparatus from above and enters the reading device via the intermediate portion of the first cable, the liquid may gather at a lower end of the U-shaped curve in the first portion and then drop down from the lower end. In other words, the image reading apparatus can eliminate liquid running the first cable at the lower end of the U-shaped curve in the first portion of the first cable.

Thus, in the image reading apparatus of the disclosure, the liquid can be prevented from reaching the electrical component in the main device and thus may reduce or prevent damage to the electrical component of the main device.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION

Figure 1:
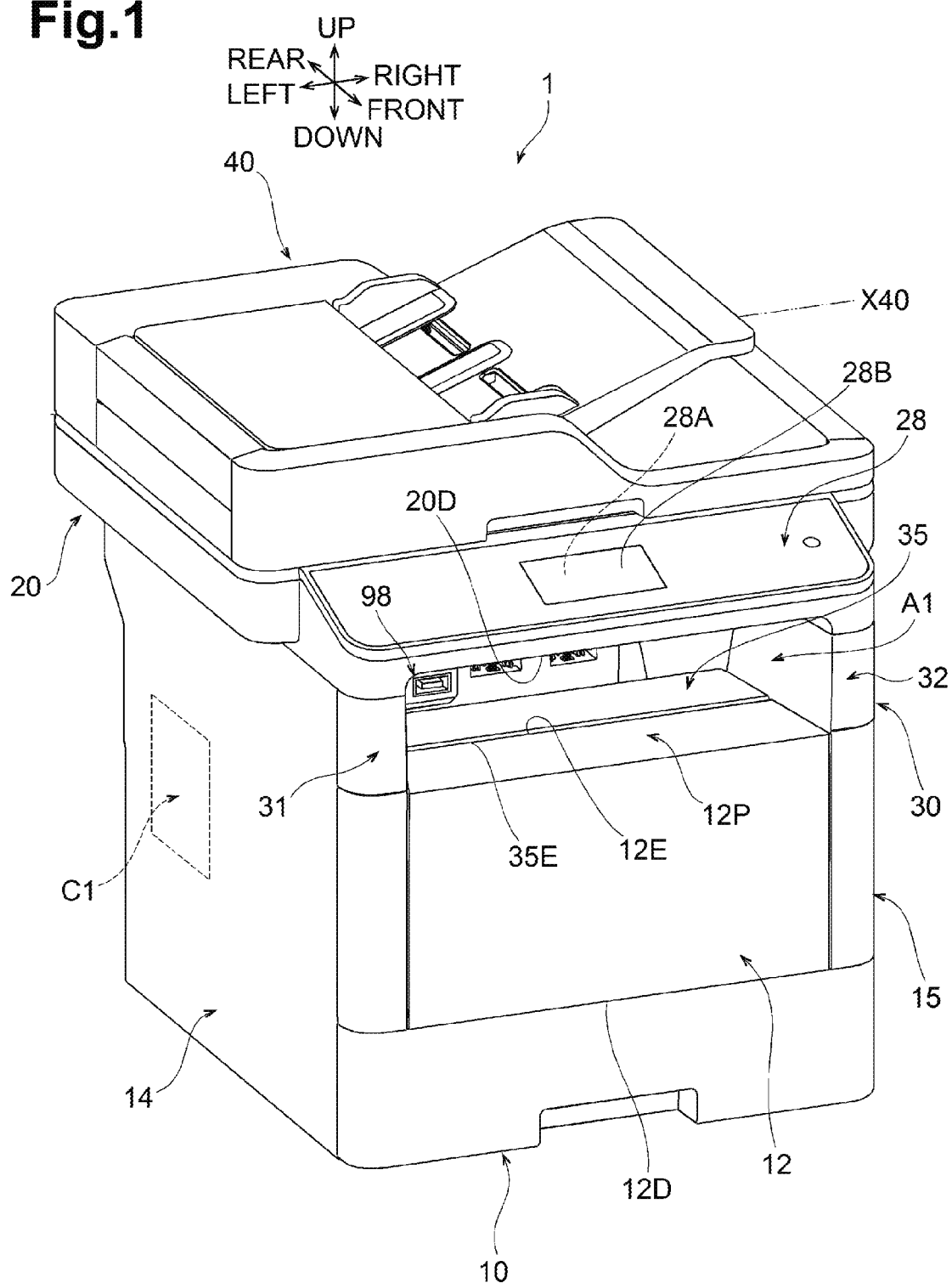
FIG. 1 is a perspective view of an image reading apparatus according to an illustrative embodiment.

Hereinafter, an illustrative embodiment will be described in detail with reference to the accompanying drawing, like reference numerals being used for like corresponding parts in the various drawings.

Illustrative Embodiment

As depicted in FIG. 1, an image reading apparatus 1 according to the illustrative embodiment is an example of an image reading apparatus. The image reading apparatus 1 may be a multifunction apparatus capable of executing multiple processing, e.g., image forming processing, as well as image reading processing. As depicted in FIG. 1, a side of the image reading apparatus 1, in which an operation panel 28 is provided, may be defined as the front of the image reading apparatus 1. A left side of the image reading apparatus 1 as viewed from the operation panel 28 may be defined as the left of the image reading apparatus 1. A front-rear direction, a right-left direction, an up-down direction may be defined with respect to the orientation of the image reading apparatus 1. The defined directions are applicable to all the drawings. Hereinafter, a detailed configuration of the image reading apparatus 1 will be described with reference to the accompanying drawings.

<Overall Configuration>

As depicted in FIGS. 1, 2, 3, 4, and 5, the image reading apparatus 1 includes a main device 10, a reading device 20, and an upper unit 40. The main device 10 is disposed below the reading device 20. The upper unit 40 is disposed above the reading device 20.

Figure 2:
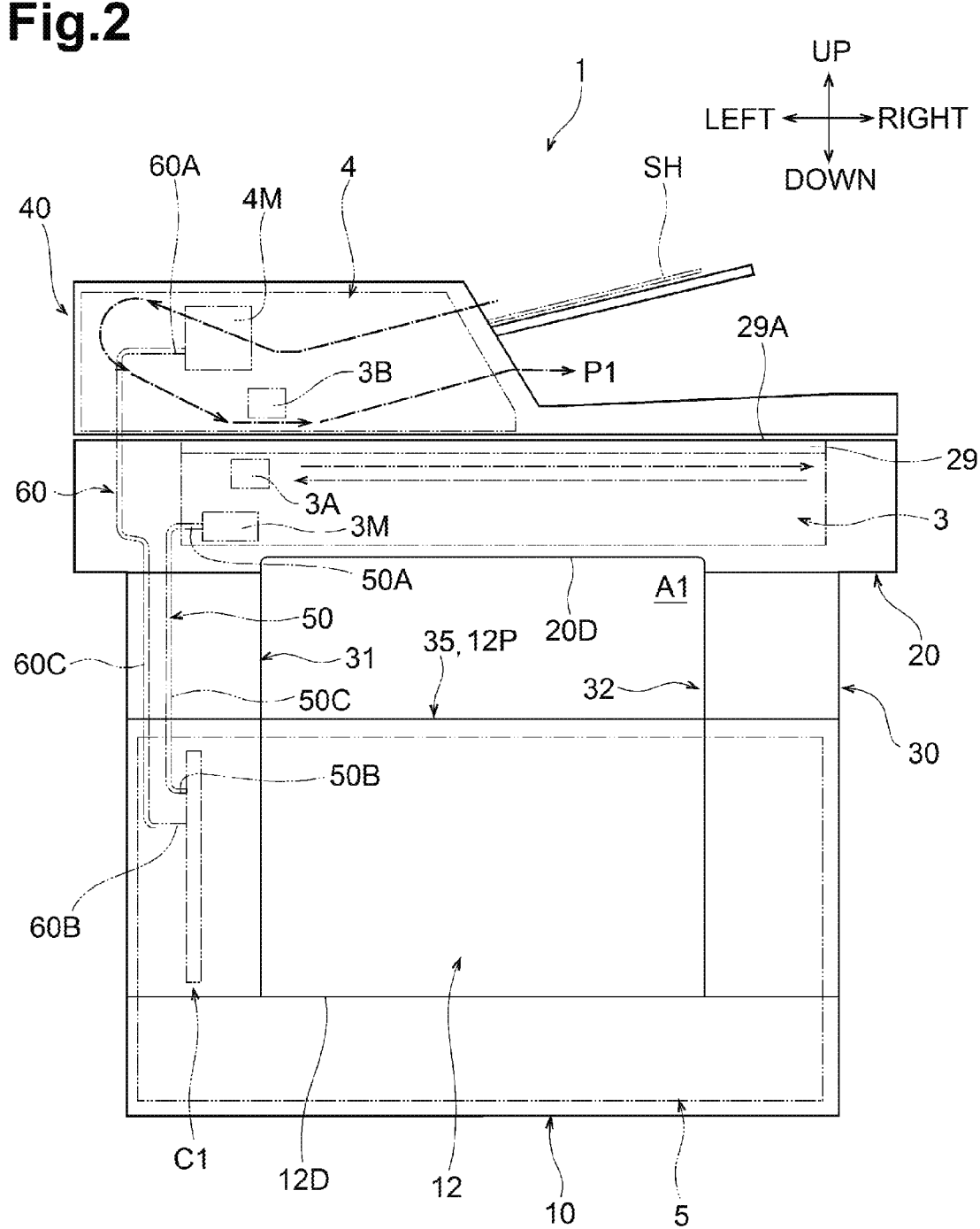
FIG. 2 is a schematic front view of the image reading apparatus.
Figure 3:
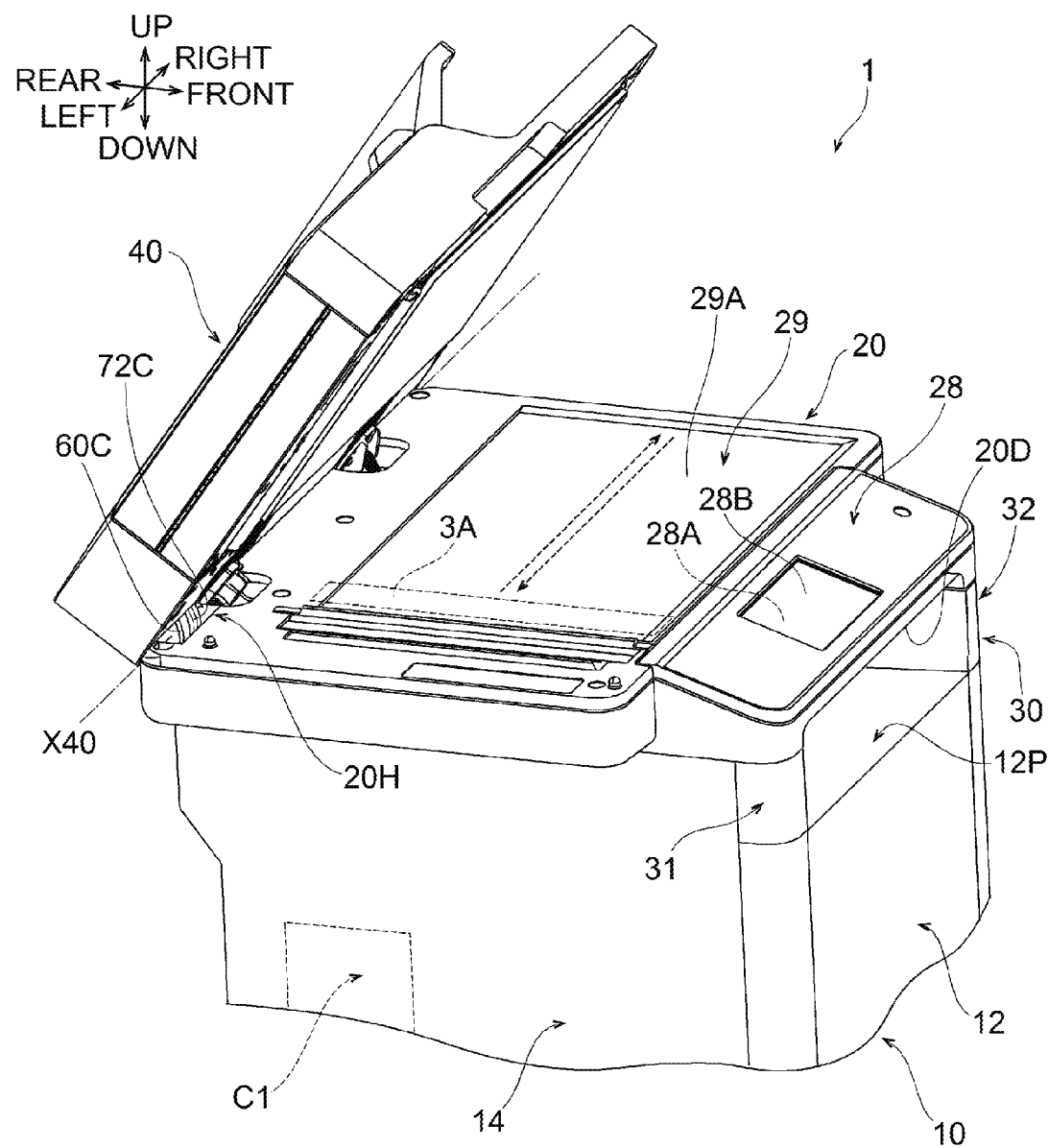
FIG. 3 is a partial perspective view of the image reading apparatus.
Figure 4:
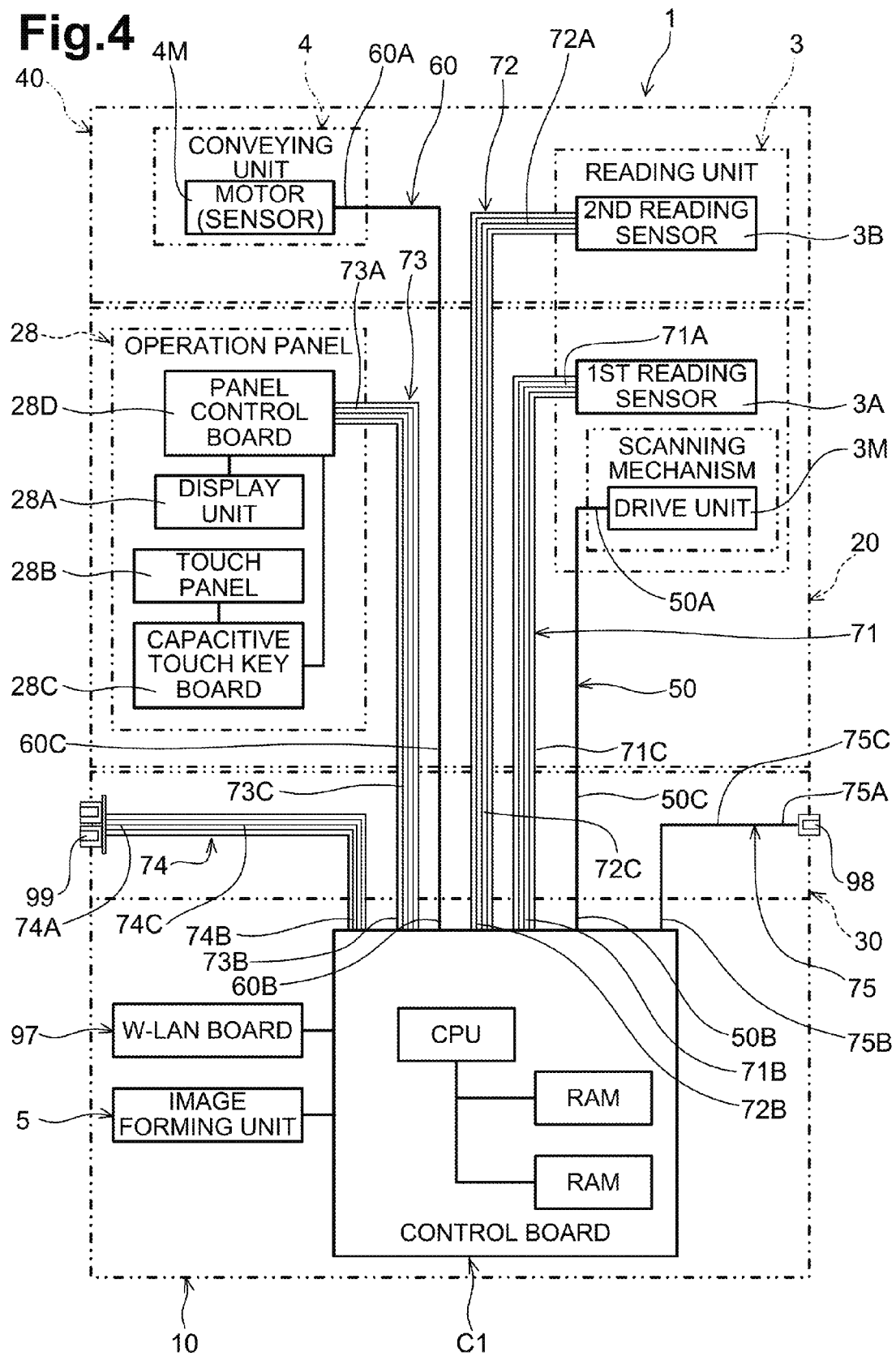
FIG. 4 is a block diagram of the image reading apparatus.

The main device 10 includes an internal frame (not depicted), an image forming unit 5 (refer to FIGS. 2 and 4), and a control board C1 (refer to FIGS. 2 and 4). The image forming unit 5 and the control board C1 are held by the internal frame and are accommodated in the main device 10. The image forming unit 5 forms an image onto a sheet by an inkjet printing method or by a laser printing method. As depicted in FIGS. 1, 2, and 3, the control board C1 is positioned adjacent to a left side surface of the main device 10 and extends both in the up-down direction and in the front-rear direction.

As depicted in FIG. 4, the control board C1 executes image forming processing by controlling the image forming unit 5. The control board C1 executes image reading processing by controlling a reading unit 3 and a conveying unit 4. The control board C1 executes various processing, e.g., input/output processing and communication processing, via an operation panel 28, a modular connector 99, a USB connector 98, and a W-LAN board 97. The control board C1 is an example of an electrical component.

As depicted in FIGS. 1, 2, 3, 4, 5, and 6, the main device 10 includes a joint cover 30. The joint cover 30 is joined to the internal frame of the main device 10 from above and constitutes an upper surface of the main device 10.

Figure 6:
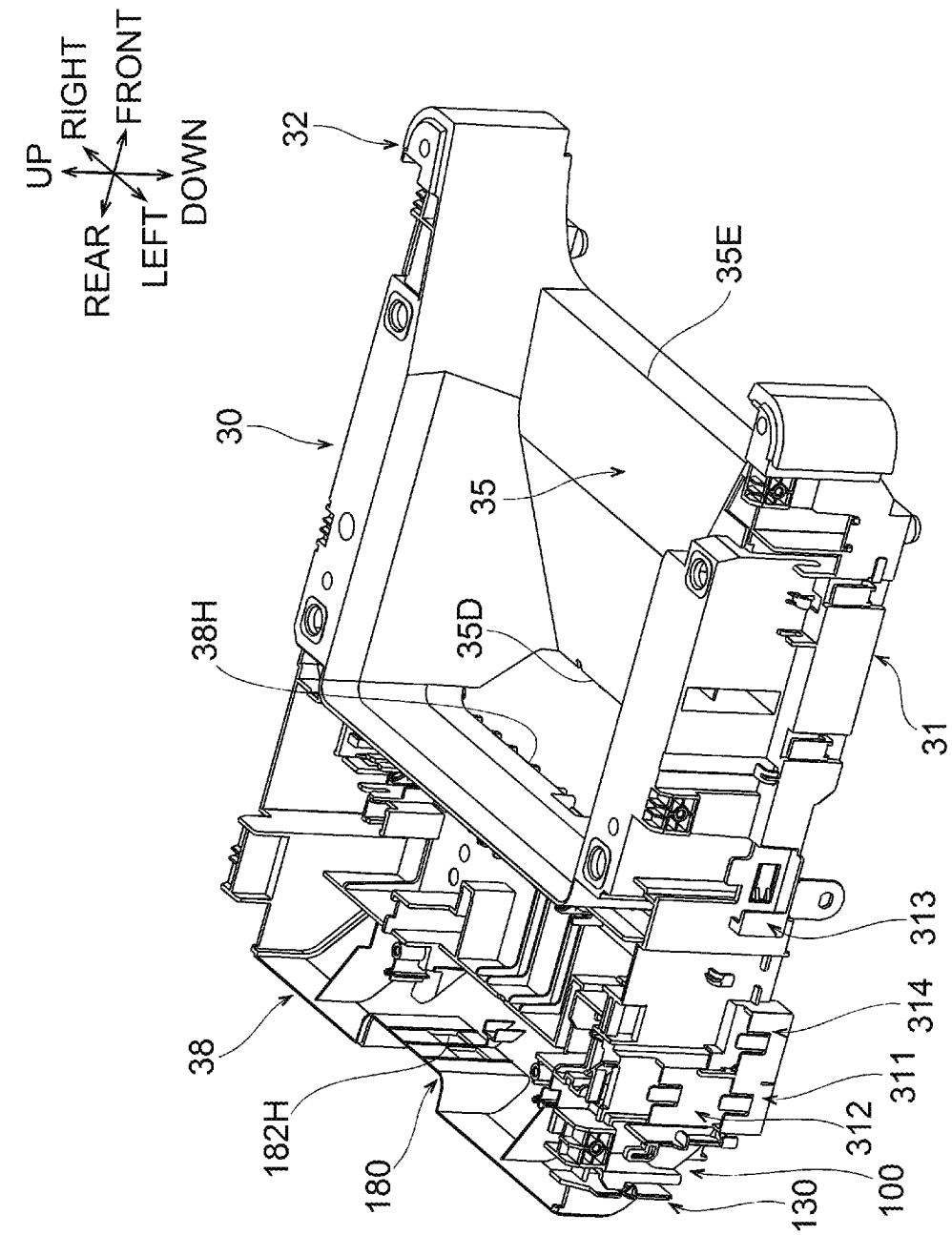
FIG. 6 is a perspective view of a joint cover.

More specifically, for example, as depicted in FIG. 6, the joint cover 30 includes a support surface 35, a first connecting portion 31, a second connecting portion 32, and a rear wall portion 38. The first connecting portion 31 is positioned further to the left than the support surface 35 in the joint cover 30. The second connecting portion 32 is positioned further to the right than the support surface 35 in the joint cover 30. The rear wall portion 38 is positioned further to the rear than the support surface 35 in the joint cover 30. The rear wall portion 38 extends in the right-left direction. The rear wall portion 38 is connected with a rear end portion of the first connecting portion 31 and a rear end portion of the second connecting portion 32.

The support surface 35 is connected with a lower end portion of the first connecting portion 31, a lower end portion of the second connecting portion 32, and a lower end portion of the rear wall portion 38. That is, the support surface 35 is surrounded by the first connecting portion 31, the second connecting portion 32, and the rear wall portion 38 on three sides, e.g., the left, the right, and the rear.

The support surface 35 has a rear end 35D and a front end 35E. The rear end 35D is positioned lower than a sheet outlet 38H defined in a front surface of the rear wall portion 38. The support surface 35 extends diagonally upward toward the front from the rear end 35D and further extends substantially horizontally toward the front to the front end 35E. As depicted in FIG. 1, the front end 35E of the support surface 35 is positioned further to the rear than a front surface of the main device 10. The support surface 35 is configured to support one or more sheets outputted from the image forming unit 5. The sheet outlet 38H may be an opening that is in communication with space in which the image forming unit 5 is accommodated, and allows a sheet having an image formed by the image forming unit 5 to pass therethrough for outputting the sheet onto the support surface 35.

As depicted in FIGS. 1 and 2, an upper end portion of the first connecting portion 31 and an upper end portion of the second connecting portion 32 of the joint cover 30 are joined to a bottom wall portion 20D of the reading device 20, whereby the main device 10 and the reading device 20 are joined to each other.

Figure 9:
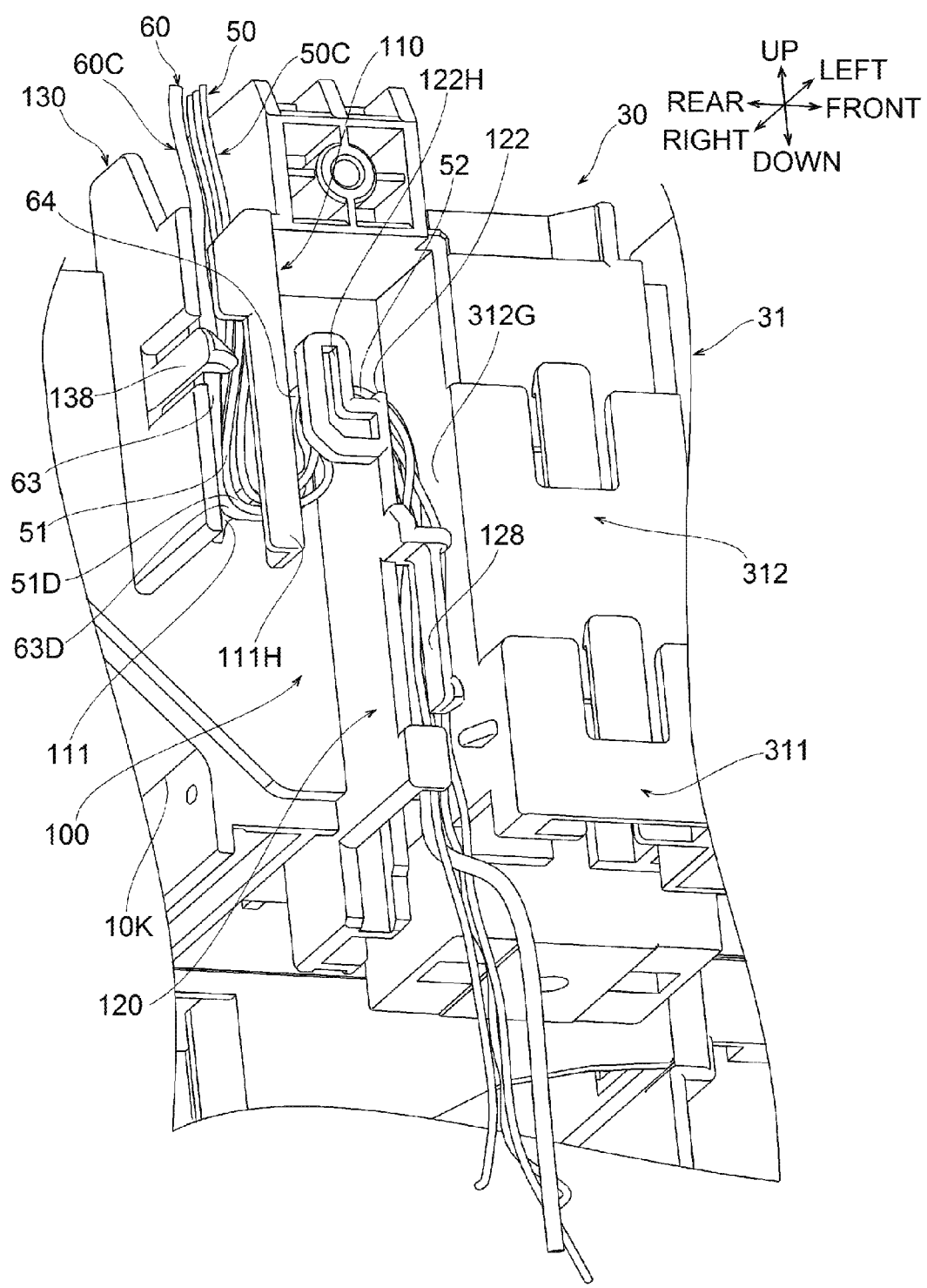
FIG. 9 is a partial perspective view of the joint cover and first and second cables.
Figure 10:
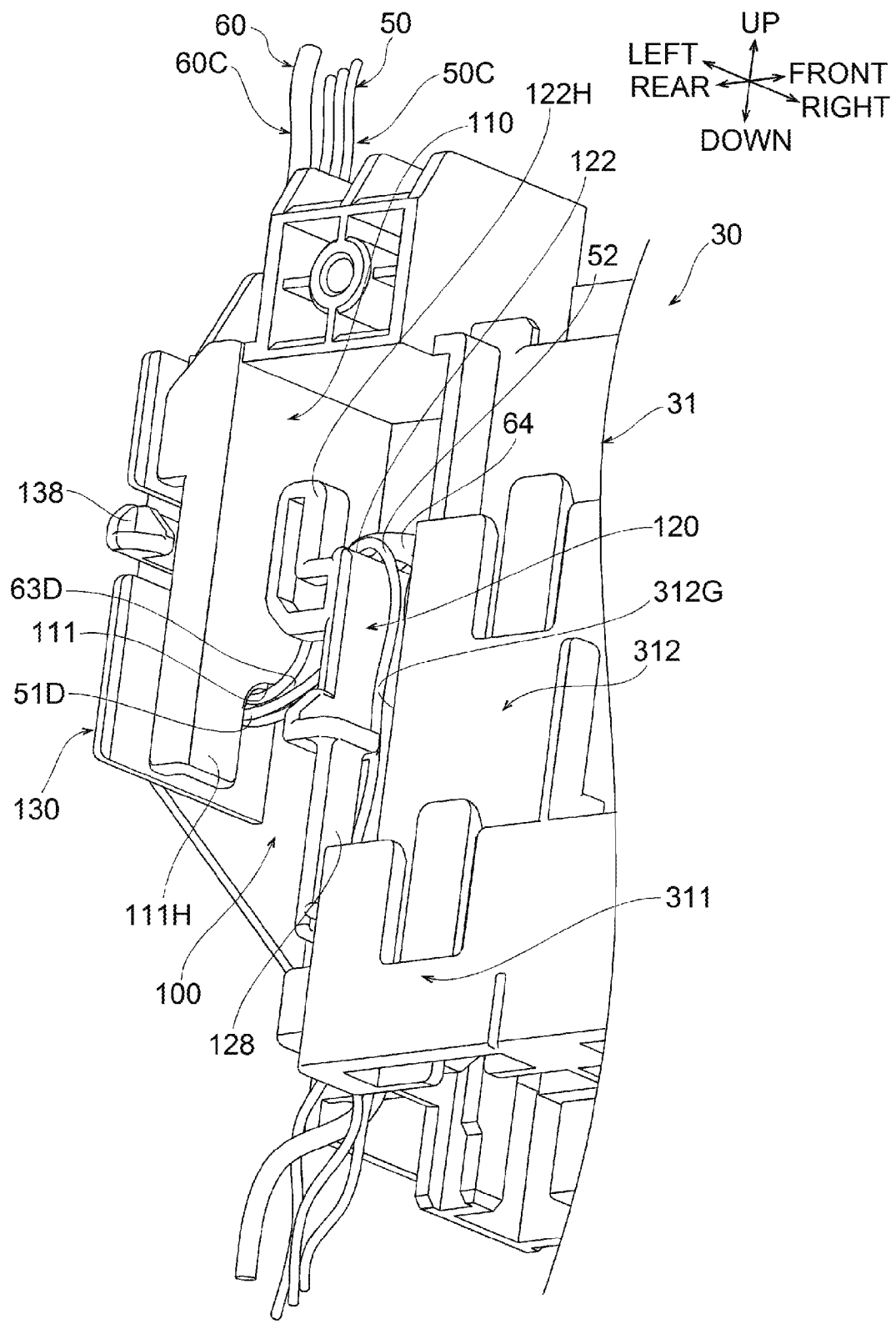
FIG. 10 is a partial perspective view of the joint cover and the first and second cables.
Figure 11:
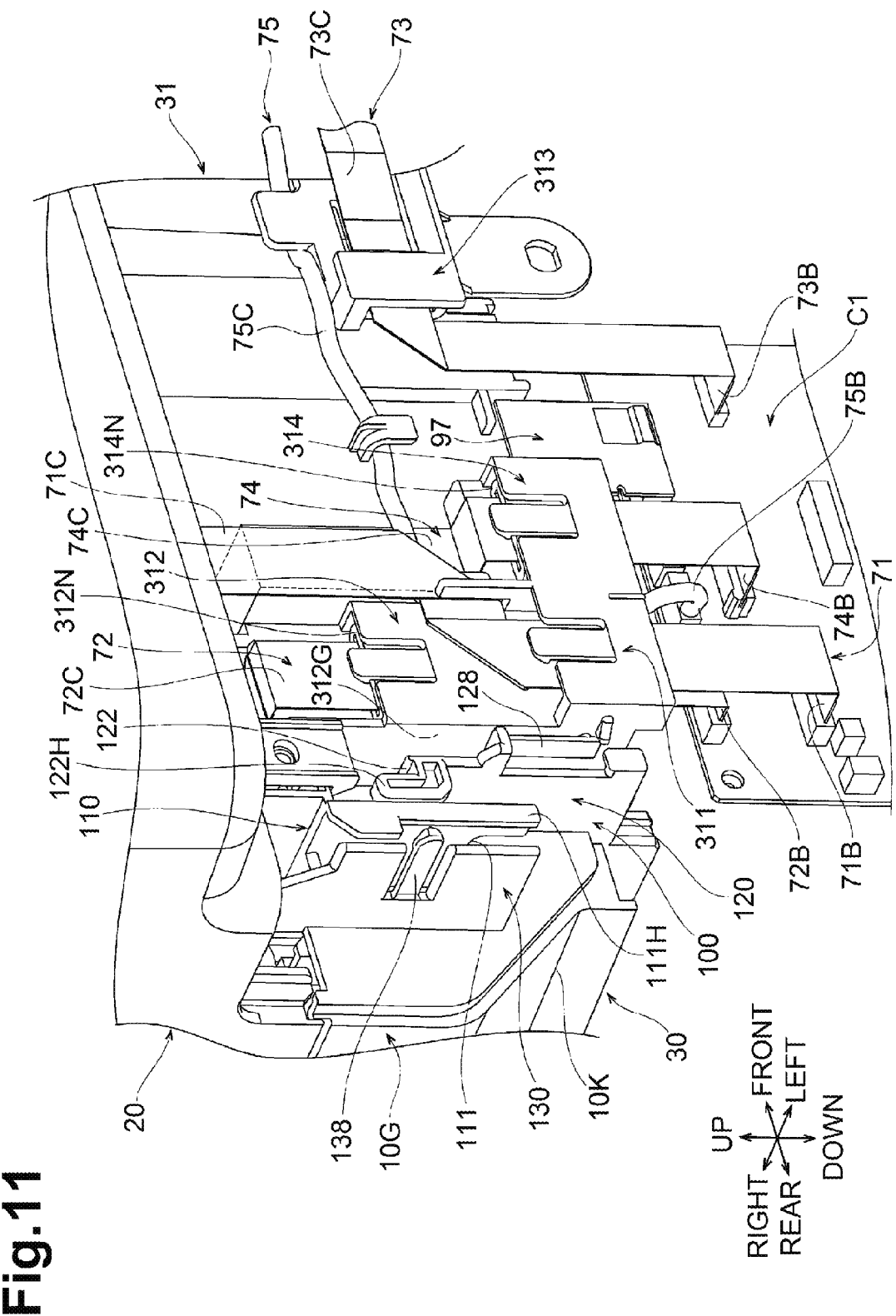
FIG. 11 is a partial perspective view of the joint cover, a control board, and flat cables.

As depicted in FIGS. 6, 7, 8, 9, 10, 11, 12A, and 12B, first connecting portion 31 includes, on its left side surface, the retaining portion 100, wall portion 130, a first flat-cable retaining portion 311, a second flat-cable retaining portion 312, a third flat-cable retaining portion 313, and a fourth flat-cable retaining portion 314. The first flat-cable retaining portion 311, the second flat-cable retaining portion 312, and the fourth flat-cable retaining portion 314 may be spaces, each of which is defined by front, rear, right, and left walls. The first flat-cable retaining portion 311, the second flat-cable retaining portion 312, and the fourth flat-cable retaining portion 314 each have a rectangular hole which penetrates a bottom thereof and is elongated in the front-rear direction. The rectangular holes allow a first flat cable 71, a second flat cable 72, and a fourth flat cable 74 to pass therethrough respectively. The third flat-cable retaining portion 313 includes upper, lower, right, and left walls and has a hole penetrating therethrough in the front-rear direction. The hole allows a third flat cable 73 to pass therethrough. As depicted in FIG. 11, the first flat-cable retaining portion 311, the second flat-cable retaining portion 312, and the fourth flat-cable retaining portion 314 are positioned directly above an upper end of the control board C1. The first flat-cable retaining portion 311 is positioned lower than the second flat-cable retaining portion 312. The fourth flat-cable retaining portion 314 is positioned further to the front than the first flat-cable retaining portion 311. The third flat-cable retaining portion 313 is positioned further to the front than the fourth flat-cable retaining portion 314. As depicted in FIGS. 2 and 11, the control board C1 is disposed below the first connecting portion 31 of the joint cover 30.

As depicted in FIG. 1, the main device 10 includes a front cover 12. The front cover 12 has a lower end 12D and an upper end 12E. The front cover 12 extends upward from the lower end 12D and further extends rearward to the upper end 12E. The front cover 12 has a front-facing surface, which constitutes a portion of an exterior of the main device 10. The upper end 12E of the front cover 12 is positioned in front of the front end 35E of the support surface 35. The front cover 12 includes a flat surface 12P including the upper end 12E. The flat surface 12P extends substantially horizontally and constitutes a flat surface contiguous to the support surface 35. With this configuration, the flat surface 12P of the front cover 12 supports one or more sheets outputted from the image forming unit 5 in cooperation with the support surface 35.

As depicted in FIGS. 1 and 2, an output space A1 is defined by the support surface 35 of the joint cover 30, a right side surface of the first connecting portion 31, a left side surface of the second connecting portion 32, the bottom wall portion 20D of the reading device 20, and the flat surface 12P of the front cover 12. A sheet having an image formed by the image forming unit 5 is outputted to the output space A1. The output space A1 is opened in the front of the image reading apparatus 1. The output space A1 allows a user to insert the hand therein from the front of the image reading apparatus 1 for taking out one or more sheets supported by the support surface 35.

As depicted in FIG. 1, the USB connector 98 is disposed at an upper left portion in the output space A1. The USB connector 98 is attached to the first connecting portion 31 of the joint cover 30. The USB connector 98 is positioned such that a connector portion of the USB connector 98 is exposed facing toward the front of the output space A1.

As depicted in FIG. 4, one end 75A of a USB cable 75 is connected to the USB connector 98. As depicted in FIG. 11, the USB cable 75 is made of a bundle of covered wires jacketed with a flexible tube. The USB cable 75 includes an intermediate portion 75C, which extends rearward along the left side surface of the first connecting portion 31 of the joint cover 30 and further extends downward. As depicted in FIGS. 4 and 11, the USB cable 75 has the other end 75B, which is connected to the control board C1.

In the illustrative embodiment, the intermediate portion 75C refers to a portion between the one end 75A and the other end 75B in the USB cable 75. Nevertheless, in other embodiments, for example, the intermediate portion 75C may refer to an entire portion or a partial portion between the one end 75A and the other end 75B in the USB cable 75. Intermediate portions of other cables may also be defined as the same as the intermediate portion 75C of the USB cable 75.

Figure 5:
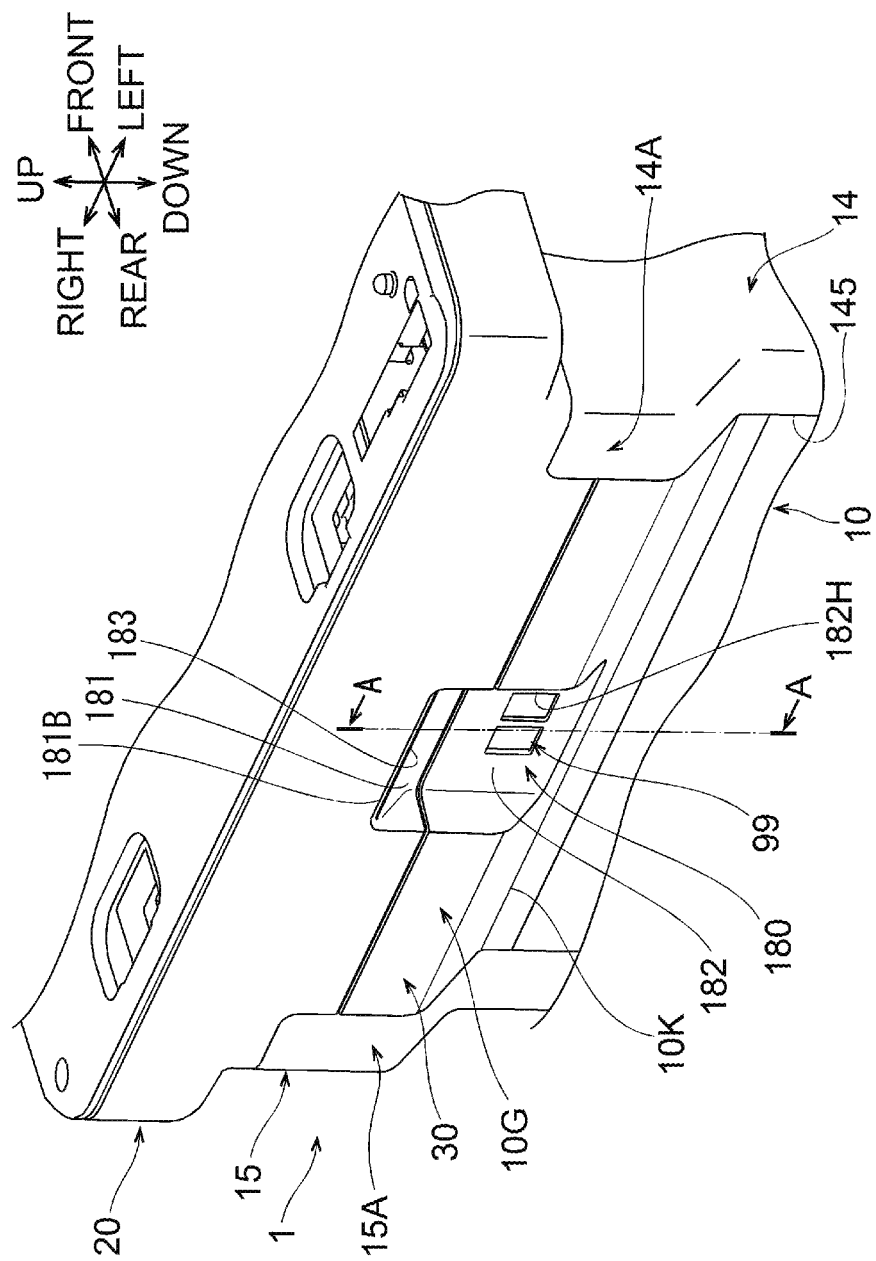
FIG. 5 is a partial perspective view of the image reading apparatus.

As depicted in FIGS. 1 and 5, the main device 10 includes a left cover 14 and a right cover 15. The left cover 14 is an example of a side wall of the main device.

The left cover 14 covers the internal frame and the image forming unit 5 of the main device 10, and the first connecting portion 31 of the joint cover 30 from the left. The right cover 15 covers the internal frame and the image forming unit 5 of the main device 10, and the second connecting portion 32 of the joint cover 30 from the right.

As depicted in FIG. 5, the left cover 14 includes a curved wall portion 14A at a rear end portion thereof. The curved wall portion 14A extends rightward along a rear surface of the main device 10 and constitutes a portion of the rear surface of the main device 10. The right cover 15 includes a curved wall portion 15A at a rear end portion thereof. The curved wall portion 15A extends leftward along the rear surface of the main device 10 and constitutes a portion of the rear surface of the main device 10.

As depicted in FIGS. 2 and 3, the reading device 20 includes a platen glass 29. The platen glass 29 constitutes an upper surface of the reading device 20. The platen glass 29 has an upper surface, which serves as a document support surface 29A for supporting a document, e.g., a sheet or a book.

As depicted in FIGS. 2 and 4, the reading device 20 accommodates therein a first reading sensor 3A, a drive unit 3M, and a scanning mechanism (not depicted). The first reading sensor 3A faces the platen glass 29 from below. The first reading sensor 3A may be a known image reading sensor, e.g., a contact image sensor ("CIS") and a charge-coupled device ("CCD").

As depicted in FIG. 4, the first flat cable 71 has one end 71A, which is connected to the first reading sensor 3A. As depicted in FIG. 11, the first flat cable 71 is made of a plurality of covered wires bonded in a band-like shape. The first flat cable 71 has an intermediate portion 71C, which extends downward from the reading device 20. The intermediate portion 71C of the first flat cable 71 is bent along the left side surface of the first connecting portion 31 of the joint cover 30. The intermediate portion 71C of the first flat cable 71 has a lower portion and an upper portion with respect to the bent portion. The lower portion of the intermediate portion 71C is further to the rear than the upper portion of the intermediate portion 71C. The lower portion of the intermediate portion 71C passes through the first flat-cable retaining portion 311 and further extends downward. As depicted in FIGS. 4 and 11, the first flat cable 71 has the other end 71B, which is connected to the control board C1. As depicted in FIG. 11, the other end 71B of the first flat cable 71 is connected to the control board C1 at a location that is further to the rear and lower than the location where the other end 75B of the USB cable 75 is connected to the control board C1.

Figures 12A, 12B:
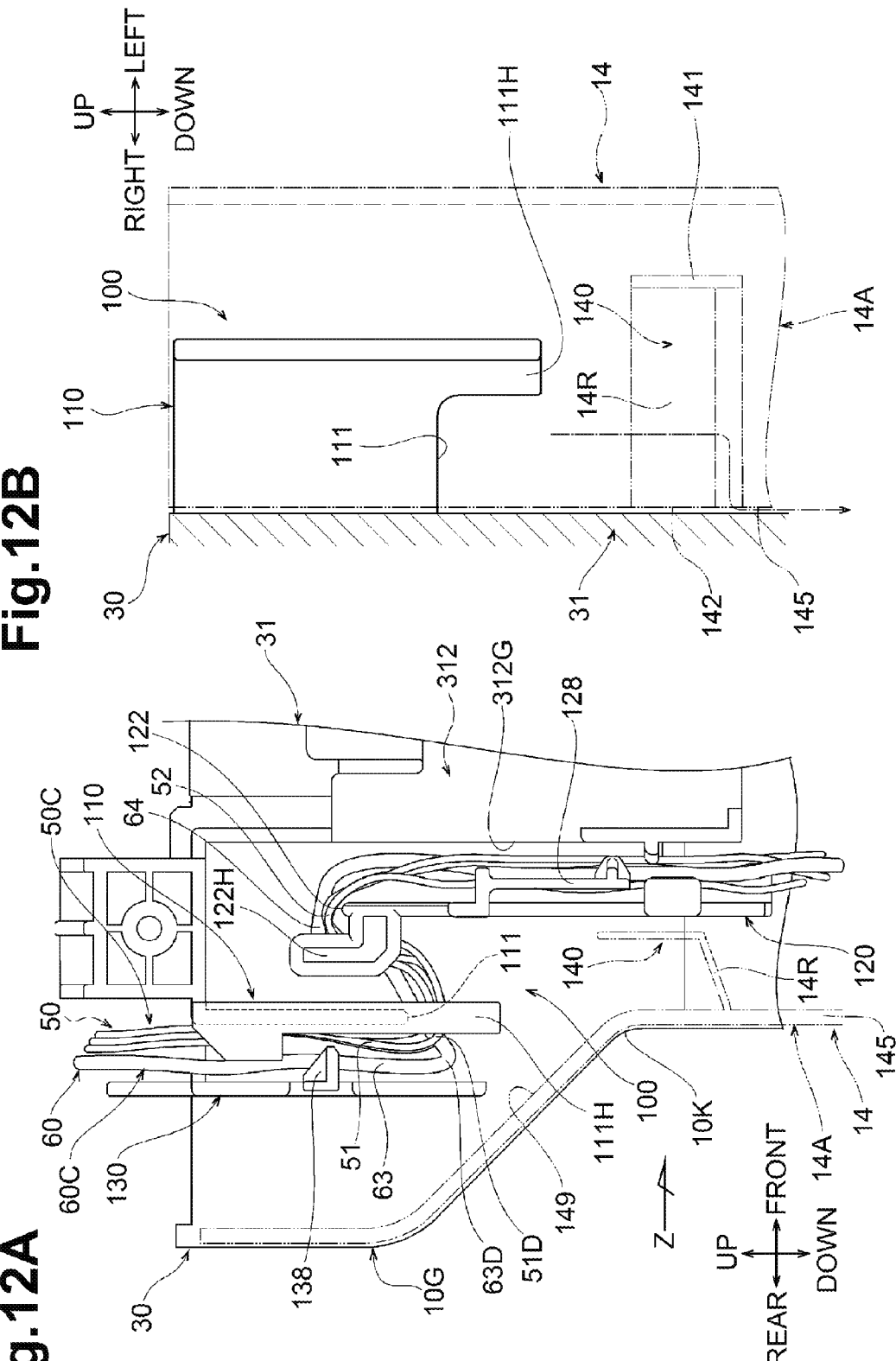
FIG. 12A is a partial side view of the joint and the first and second cables.
FIG. 12B schematically depicts a first retaining portion and a groove portion as viewed in a direction of arrow Z of FIG. 12A.

The drive unit 3M may be a stepping motor. As depicted in FIGS. 2 and 4, one end 50A of a first cable 50 is connected to the drive unit 3M. As depicted in FIGS. 9, 10, and 12A, the first cable 50 may be a bundle of covered wires. The first cable 50 has an intermediate portion 50C, which extends downward from the reading device 20. The intermediate portion 50C of the first cable 50 is retained by the retaining portion 100 of the first connecting portion 31 of the joint cover 30 and is curved twice at the retaining portion 100 and further extends downward from the retaining portion 100. As depicted in FIGS. 2 and 4, the first cable 50 has the other end 50B, which is connected to the control board C1.

The scanning mechanism supports the first reading sensor 3A. When an image is read from a document supported by the document support surface 29A, as depicted in FIGS. 2 and 4, the scanning mechanism is driven by the drive unit 3M to reciprocate the first reading sensor 3A in the right-left direction. When an image is read from a sheet SH being conveyed by the conveying unit 4, the scanning mechanism is driven by the drive unit 3M to have the first reading sensor 3A stay at a predetermined stationary sheet reading position.

As depicted in FIG. 1, the upper unit 40 is supported by the reading device 20 via a hinge (not depicted) disposed at a rear end of the reading device 20 such that the upper unit 40 is pivotable on an axis X40 extending in the right-left direction. The upper unit 40 covers the document support surface 29A from above in a closed state as depicted in FIGS. 1 and 2. When the upper unit 40 pivots on the axis X40 such that its front portion moves upwardly rearward, the upper unit 40 becomes in an open state as depicted in FIG. 3 to expose the document support surface 29A. In this state, the upper unit 40 allows the user to place a document to be read on the document support surface 29A.

In the illustrative embodiment, a document refers to a target whose image is read through the use of the document support surface 29A. A sheet SH refers to a target whose image is read through the use of the conveying unit 4. A document and a sheet SH may be substantially the same one.

As depicted in FIGS. 2 and 4, the upper unit 40 accommodates therein the conveying unit 4 and the second reading sensor 3B. The conveying unit 4 includes a motor 4M and a sheet position sensor (not depicted). As depicted in FIG. 2, the conveying unit 4 conveys a sheet SH one by one along a predetermined conveying path P1.

As depicted in FIGS. 2 and 4, one end 60A of a second cable 60 is connected to the motor 4M and the sheet position sensor. As depicted in FIGS. 9, 10, and 12A, the second cable 60 is made of a bundle of covered wires jacketed with a flexible tube. The second cable 60 includes an intermediate portion 60C, which extends from the upper unit 40 into the reading device 20 through an opening 20H defined in an upper surface of the reading device 20 as depicted in FIG. 3. As depicted in FIGS. 9, 10, and 12A, the intermediate portion 60C further extends downward from the reading device 20. The intermediate portion 60C of the second cable 60 is retained by the retaining portion 100 together with the intermediate portion 50C of the first cable 50 and is curved twice at the retaining portion 100 and further extends downward. As depicted in FIGS. 2 and 4, the second cable 60 has the other end 60B, which is connected to the control board C1.

The second reading sensor 3B may be the same type of sensor as the first reading sensor 3A. As depicted in FIG. 2, the second reading sensor 3B is disposed such that the second reading sensor 3B can read an image from a sheet SH being conveyed along the conveying path P1 at a position where the second reading sensor 3B faces the first reading sensor 3A located at the stationary sheet reading position. The position of the second reading sensor 3B is not limited to the position of the second reading sensor 3B depicted in FIG. 2.

Figure 7:
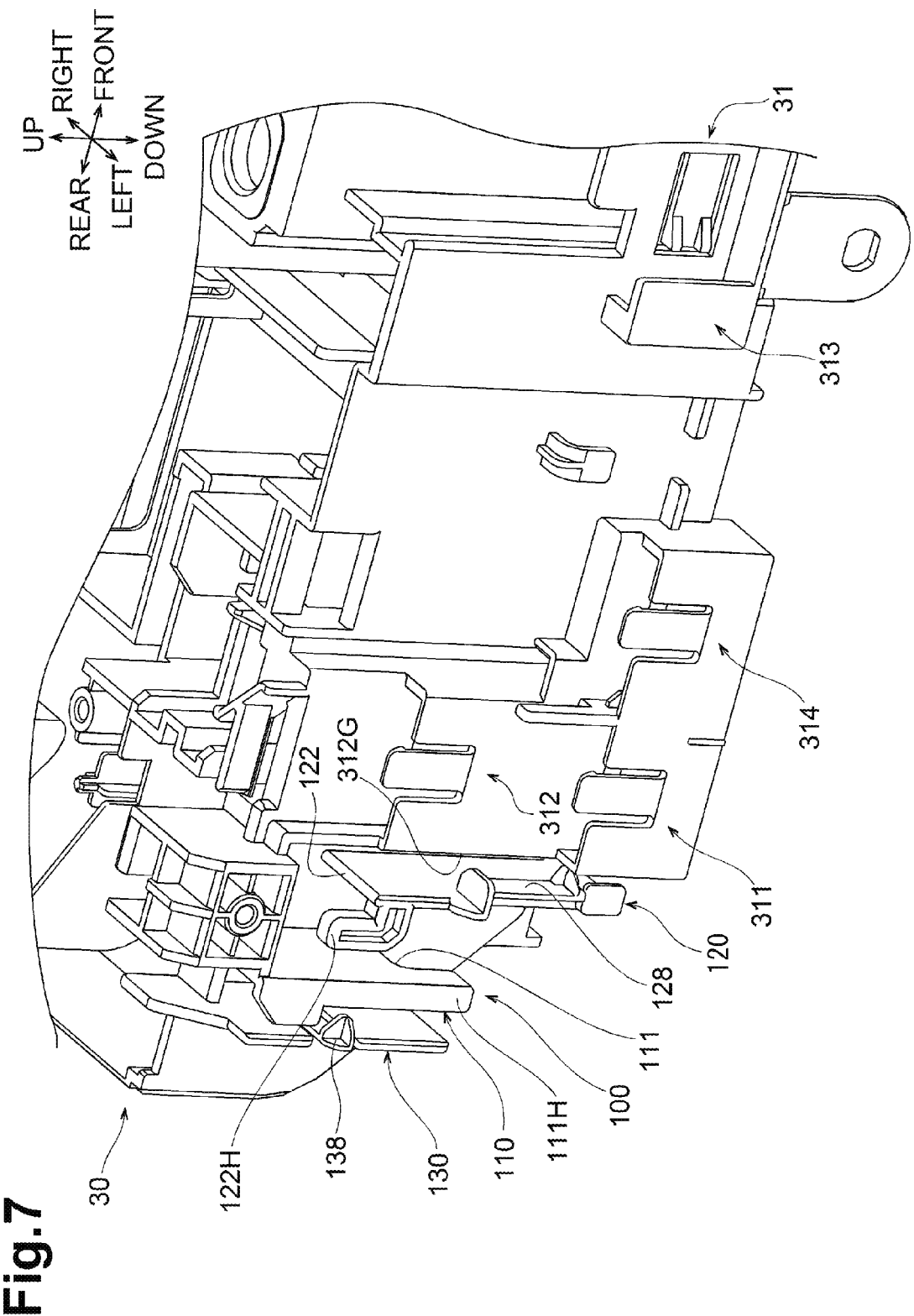
FIG. 7 is a partial perspective view of the joint cover.
Figure 8:
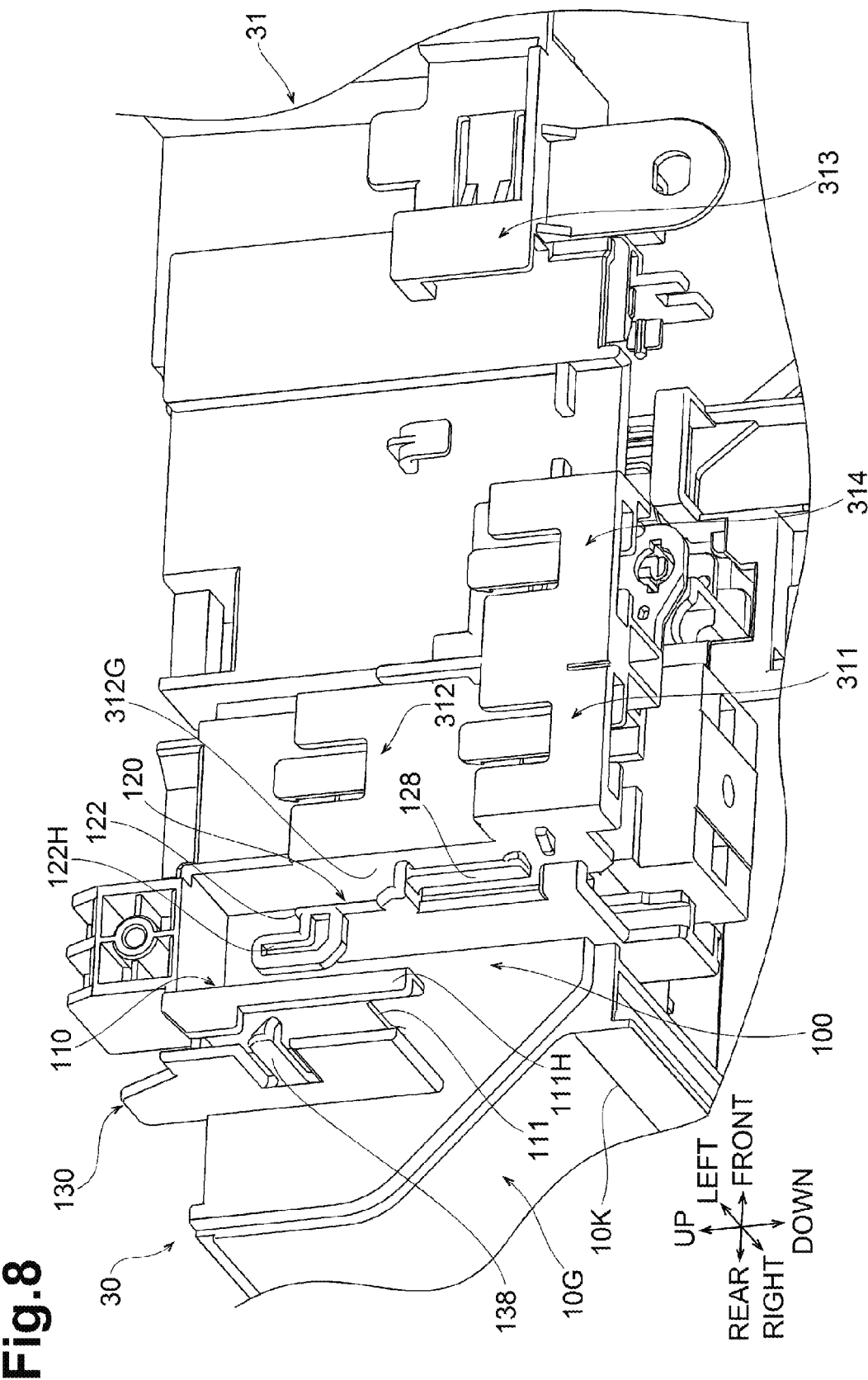
FIG. 8 is a partial perspective view of the joint cover.

As depicted in FIG. 4, one end 72A of the second flat cable 72 is connected to the second reading sensor 3B. As depicted in FIG. 11, the second flat cable 72 is made of a plurality of covered wires bonded in a band-like shape. The second flat cable 72 has an intermediate portion 72C, which extends from the upper unit 40 into the reading device 20 through the opening 20H (refer to FIG. 3) and further extends downward from the reading device 20 as depicted in FIG. 11. The intermediate portion 72C of the second flat cable 72 extends downward along the left side surface of the first connecting portion 31 of the joint cover 30 and passes through the second flat-cable retaining portion 312. The intermediate portion 72C of the second flat cable 72 further extends downward from the second flat-cable retaining portion 312. A ferrite core 312N for reducing noise is disposed at the second flat-cable retaining portion 312. When viewed from the right or the left in the right-left direction, the intermediate portion 72C of the second flat cable 72 includes a portion overlapping the intermediate portion 71C of the first flat cable 71. As depicted in FIGS. 7 and 8, the first flat-cable retaining portion 311 is disposed to the left of the second flat-cable retaining portion 312. That is, the first flat-cable retaining portion 311 protrudes leftward than the second flat-cable retaining portion 312. Therefore, the intermediate portion 71C of the first flat cable 71 and the intermediate portion 72C of the second flat cable 72 are kept separate from each other in the right-left direction and thus adverse influence due to noise that may exert on each other may be reduced. As depicted in FIGS. 4 and 11, the other end 72B of the second flat cable 72 is connected to the control board C1. As depicted in FIG. 11, the other end 72B of the second flat cable 72 is connected to the control board C1 at a location that is further to the rear than the location where the other end 75B of the USB cable 75 is connected to the control board C1. The other end 72B of the second flat cable 72 is connected to the control board C1 at a location that is higher than the location where the other end 71B of the first flat cable 71 is connected to the control board C1.

As depicted in FIGS. 2 and 4, the reading unit 3 includes the first reading sensor 3A, the second reading sensor 3B, the drive unit 3M, and the scanning mechanism.

When an image is read from a document supported by the document support surface 29A, the control board C1 controls the first reading sensor 3A and the drive unit 3M to reciprocate the first reading sensor 3A in the right-left direction under the platen glass 29 as depicted in FIGS. 2 and 3. The first reading sensor 3A reads a portion of the image of the document line by line in the front-rear direction (e.g., a main scanning direction) while moving in the right-left direction (e.g., a sub-scanning direction). By doing so, the first reading sensor 3A reads an entire portion of the image of the document.

When an image is read from a sheet SH being conveyed by the conveying unit 4, the control board C1 controls the drive unit 3M to have the first reading sensor 3A stay at the stationary sheet reading position. Then, the control board C1 controls the first reading sensor 3A, the second reading sensor 3B, and the motor 4M of the conveying unit 4 to enable the first reading sensor 3A, positioned at the stationary sheet reading position, to read an image from one side of the sheet SH passing over the first reading sensor 3A and the second reading sensor 3B to read an image from the other side of the sheet SH. When an image is read from only one of the sides of the sheet SH, only the first reading sensor 3A operates.

As depicted in FIG. 1, the reading device 20 includes a front end portion that protrudes frontward relative to the upper unit 40. The operation panel 28 is disposed at an upper surface of the protruding portion. The operation panel 28 may be a user interface for displaying an operating status and settings of the image reading apparatus 1 and accepting a user's input.

More specifically, for example, as depicted in FIGS. 1 and 4, the operation panel 28 includes a display unit 28A and a touch panel 28B. The touch panel 28B is disposed overlapping the display unit 28A. The display unit 28A may be a liquid crystal display ("LCD"). As depicted in FIG. 4, the operation panel 28 holds therein a capacitive touch key board 28C and a panel control board 28D. The capacitive touch key board 28C is connected to the touch panel 28B and capacitive touch keys (not depicted). The panel control board 28D is connected with the display unit 28A and the capacitive touch key board 28C.

As depicted in FIG. 4, one end 73A of the third flat cable 73 is connected to the panel control board 28D. As depicted in FIG. 11, the third flat cable 73 is made of a plurality of covered wires bonded in a band-like shape. The third flat cable 73 has an intermediate portion 73C, which extends rearward along the left side surface of the first connecting portion 31 of the joint cover 30 and passes through the third flat-cable retaining portion 313. The intermediate portion 73C of the third flat cable 73 is bent and further extends downward. As depicted in FIGS. 4 and 11, the third flat cable 73 has the other end 73B, which is connected to the control board C1. As depicted in FIG. 11, the other end 73B of the third flat cable 73 is connected to the control board C1 at a location that is further to the front than the location where the other end 75B of the USB cable 75 is connected to the control board C1.

Figure 13:
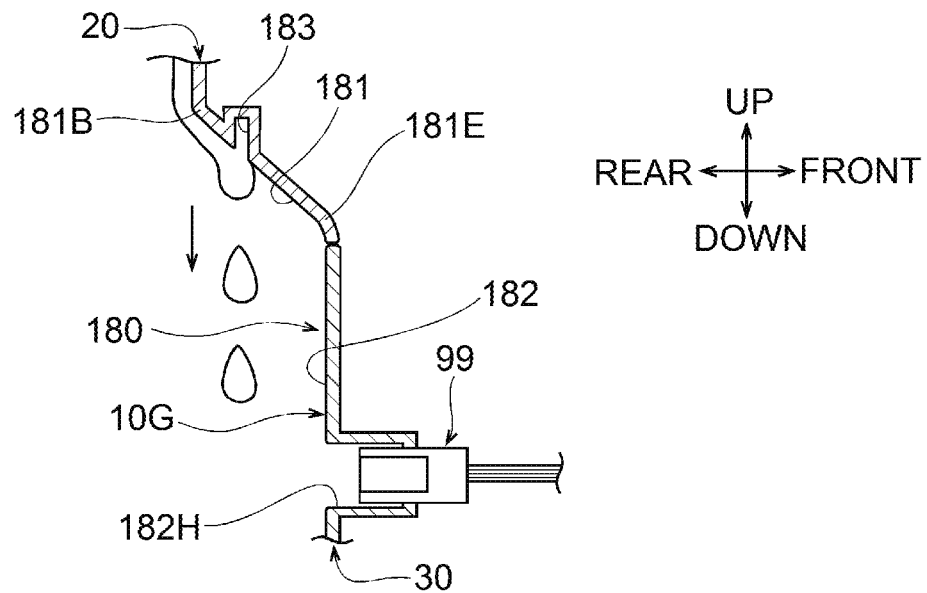
FIG. 13 is a cross sectional view taken along line A-A of FIG. 5, depicting first and second wall surfaces of a recessed portion, the groove portion, and a potential portion.

As depicted in FIGS. 5 and 13, a portion of a rear surface of the image reading apparatus 1 constituted of a rear surface of the reading device 20 and a rear surface of the joint cover 30 refers to a rear surface 10G. The rear surface 10G is an example of "a specified side surface". The rear surface 10G extends downward substantially perpendicularly at the rear surface of the reading device 20 and further extends diagonally downward toward the front from a middle portion of the rear surface of the joint cover 30 in the up-down direction. The rear surface 10G changes its extending direction at a turning portion 10K and further extends downward substantially perpendicularly.

The rear surface 10G has a recessed portion 180. The recessed portion 180 is recessed toward the inside of the main device 10, i.e., frontward, relative to the rear surface 10G. The recessed portion 180 includes a first wall surface 181 and a second wall surface 182. The first wall surface 181 extends diagonally downward toward the front from the rear surface 10G. The first wall surface 181 includes a front end portion 181E, which is distant from and further to the front than the rear surface 10G. The second wall surface 182 extends downward from the front end portion 181E.

The first wall surface 181 has a groove 183 that is upwardly recessed relative to the first wall surface 181. The groove 183 extends substantially parallel to a boundary line 181B, i.e., extends along the right-left direction. The boundary line 181B separates a vertical surface of the rear surface 10G and the first wall surface 181 from each other. The groove 183 has right and left ends that reach right and left ends, respectively, of the first wall surface 181.

As depicted in FIGS. 5 and 6, the joint cover 30 has a mounting hole 182H therethrough at a portion of the rear surface constituting a portion of the second wall surface 182 in the joint cover 30. As depicted in FIG. 13, the modem connector 99 is attached in the mounting hole 182H of the second wall surface 182 so as to be exposed at the rear surface 10G. The modem connector 99 is an example of a potential portion having a potential to the ground and being accessible from outside. For example, an Internet cable may be connected to the modem connector 99.

As depicted in FIG. 4, one end 74A of the fourth flat cable 74 is connected to the modem connector 99. As depicted in FIG. 11, the fourth flat cable 74 is made of a plurality of covered wires bonded in a band-like shape. The fourth flat cable 74 has an intermediate portion 74C, which extends inside the rear wall portion 38 of the joint cover 30 and reaches the left side surface of the first connecting portion 31. As depicted in FIG. 11, the intermediate portion 74C of the fourth flat cable 74 is bent along the left side surface of the first connecting portion 31. The intermediate portion 74C of the fourth flat cable 74 has a lower portion and an upper portion with respect to the bent portion. The lower portion of the intermediate portion 74C is further to the left than the upper portion of the intermediate portion 74C. The lower portion of the intermediate portion 74C passes through the fourth flat-cable retaining portion 314 and further extends downward. A ferrite core 314N for reducing noise is disposed at the fourth flat-cable retaining portion 314. When viewed from the right or the left in the right-left direction, the intermediate portion 74C of the fourth flat cable 74 includes a portion overlapping the intermediate portion 71C of the first flat cable 71. As depicted in FIGS. 7 and 8, the left side surface of the first connecting portion 31 has a recessed portion, which is recessed rightward relative to the fourth flat-cable retaining portion 314, at an area above the fourth flat-cable retaining portion 314. That is, the fourth flat-cable retaining portion 314 is disposed at a protruding portion that protrudes leftward relative to the recessed area of the left side surface of the first connecting portion 31. In the intermediate portion 74C of the fourth flat cable 74, the upper portion relative to a portion of the intermediate portion 74C retained by the fourth flat-cable retaining portion 314 extends along the left side surface of the first connecting portion 31. The intermediate portion 71C of the first flat cable 71 extends in the up-down direction at a location distant from the left side surface of the first connecting portion 31 by a predetermined distance. Therefore, the intermediate portion 71C of the first flat cable 71 and the intermediate portion 74C of the fourth flat cable 74 are kept separate from each other in the right-left direction and thus adverse influence due to noise that may exert on each other may be reduced. As depicted in FIGS. 4 and 11, the other end 74B of the fourth flat cable 74 is connected to the control board C1. As depicted in FIG. 11, the other end 74B of the fourth flat cable 74 is connected to the control board C1 at a location that is further to the front than the location where the other end 75B of the USB cable 75 is connected to the control board C1 and is further to the rear than the location where the other end 73B of the third flat cable 73 is connected to the control board C1.

As depicted in FIGS. 4 and 11, the W-LAN board 97 is connected to the control board C1. The W-LAN board 97 is configured to allow the image reading apparatus 1 to communicate with an external image processing device via a wireless LAN. As depicted in FIG. 11, the W-LAN board 97 is connected to the control board C1 at a location that is further to the front than the location where the other end 74B of the fourth flat cable 74 is connected to the control board C1 and is further to the rear than the location where the other end 73B of the third flat cable 73 is connected to the control board C1. A portion of the W-LAN board 97 protrudes upward beyond the upper end of the control board C1. The first, second, third, and fourth flat cables 71, 72, 73, and 74 and the USB cable 75 are disposed at the respective positions separate from the W-LAN board 97 such that the cables 71, 72, 73, and 74 might not degrade transmission/reception performance of the W-LAN board 97.

<Detailed Structure of Retaining Portion and Wall Portion>

As depicted in FIGS. 7, 8, 9, 10, 11, 12A and 12B, in the illustrative embodiment, the retaining portion 100 and the wall portion 130 are one piece with the left side surface of the first connecting portion 31 of the joint cover 30, which may be resin molded part.

The retaining portion 100 includes a first retaining portion 110 and a second retaining portion 120. The first retaining portion 110 and the second retaining portion 120 are positioned further to the rear than the first flat-cable retaining portion 311 and the second flat-cable retaining portion 312 and close to the rear surface of the joint cover 30. The second retaining portion 120 is positioned further to the front than the first retaining portion 110 and is spaced from the first retaining portion 110 by a predetermined distance. When viewed from the front or the rear in the front-rear direction, the first retaining portion 110 and the second retaining portion 120 have overlapping portions.

As depicted in FIG. 11, the second retaining portion 120 is positioned above and spaced from an upper rear corner of the control board C1. The first retaining portion 110 is positioned above and further to the rear than the control board C1.

As depicted in FIGS. 7, 8, 9, 10, 11, 12A, and 12B, the first retaining portion 110 protrudes leftward from the left side surface of the first connecting portion 31 and extends in the up-down direction. The first retaining portion 110 may have a substantially plate-like shape. As depicted in FIG. 12A, when viewed from the right or the left in the right-left direction, the first retaining portion 110 is positioned substantially directly above the turning portion 10K of the rear surface 10G. As depicted in FIG. 12B, the first retaining portion 110 is adjacent to the left cover 14 of the main device 10.

As depicted in FIGS. 7, 8, 9, 10, 11, 12A, and 12B, the first retaining portion 110 includes a rib at its left end portion. The rib extends rearward and is elongated in the up-down direction. As depicted in FIGS. 7, 8, and 12B, the first retaining portion 110 includes a first end 111 at its lower end. The first end 111 extends in the right-left direction. The first end 111 has a left end, which extends downward and is contiguous to a lower end of the rib of the first retaining portion 110. The downwardly extending portion of the left end of the first end 111 and the lower end of the rib of the first retaining portion 110 constitutes a preventive portion 111H.

As depicted in FIGS. 7, 8, 9, 10, 11, 12A, and 12B, the second retaining portion 120 protrudes leftward from the left side surface of the first connecting portion 31 and extends in the up-down direction. The second retaining portion 120 may have a substantially plate-like shape. The second retaining portion 120 is positioned further to the rear than a rear end face 312 of the second flat-cable retaining portion 312 by a predetermined distance. The second retaining portion 120 faces the rear end face 312 of the second flat-cable retaining portion 312. As depicted in FIG. 12A, when viewed from the right or the left in the right-left direction, the second retaining portion 120 is positioned further to the front than and is spaced from the turning portion 10K of the rear surface 10G.

As depicted in FIG. 7, the second retaining portion 120 includes a second end 122 at its upper end. The second end 122 faces upward and extends in the right-left direction. The second end 122 includes a preventive portion 122H at its left end portion. The preventive portion 122H extends rearward and further extends upward.

As depicted in FIGS. 7, 8, 9, 10, 11, 12A, and 12B, the second retaining portion 120 includes a flexible portion 128 at its left end. The flexible portion 128 is branched from the second retaining portion 120 and extends downward while only its one end is fixed. The flexible portion 128 has a lower end portion protruding frontward. The flexible portion 128 is elastically deformable such that the lower end portion moves in the front-rear direction.

The wall portion 130 is opposite to the second retaining portion 120 relative to the first retaining portion 110. That is, the wall portion 130 is disposed between the first retaining portion 110 and the rear surface of the joint cover 30. The wall portion 130 protrudes leftward from the left side surface of the first connecting portion 31 and extends in the up-down direction. The wall portion 130 may have a substantially plate-like shape. As depicted in FIG. 12A, when viewed from the left in the right-left direction, the wall portion 130 is further toward rear than and is spaced from the turning portion 10K of the rear surface 10G.

The wall portion 130 includes a flexible portion 138 at its substantially middle portion in the up-down direction. The flexible portion 138 is disposed at a cutout portion of a plate-like portion of the wall portion 130, and extends leftward while only its one end is fixed. The flexible portion 138 has a left end portion protruding frontward. The flexible portion 138 is elastically deformable such that the left end portion moves in the front-rear direction.

The intermediate portion 50C of the first cable 50 and the intermediate portion 60C of the second cable 60 are retained by the first retaining portion 110, the second retaining portion 120, and the wall portion 130 in a manner described below.

As depicted in FIGS. 9, 10, and 12A, the intermediate portion 50C of the first cable 50 includes a first portion 51 that extends downward from the reading device 20. The intermediate portion 60C of the second cable 60 includes a third portion 63 that extends downward from the reading device 20. The first portion 51 of the first cable 50 and the third portion 63 of the second cable 60 are inserted between the first retaining portion 110 and the wall portion 130. At that time, the flexible portion 138 of the wall portion 130 is bent rearward. Bending of the flexible portion 138 may facilitate the insertion of the first portion 51 of the first cable 50 and the third portion 63 of the second cable 60 between the first retaining portion 110 and wall portion 130. Thereafter, the restored flexible portion 138 retains the first portion 51 of the first cable 50 and the third portion 63 of the second cable 60 so as not to come out from between the first retaining portion 110 and the wall portion 130.

Then, the first portion 51 of the first cable 50 and the third portion 63 of the second cable 60 are come into contact with the first end 111 of the first retaining portion 110 to change a routing direction to the upward direction. At that time, the preventive portion 111H of the first retaining portion 110 retains the first portion 51 of the first cable 50 and the third portion 63 of the second cable 60 so as not to disengage from the first end 111 of the first retaining portion 110.

The intermediate portion 50C of the first cable 50 includes a second portion 52 that extends upward from the first retaining portion 110. The intermediate portion 60C of the second cable 60 includes a fourth portion 64 that extends upward from the first retaining portion 110. Thereafter, the second portion 52 of the first cable 50 and the fourth portion 64 of the second cable 60 are come into contact with the second end 122 of the second retaining portion 120 to change the routing direction to the downward direction. At that time, the preventive portion 122H of the second retaining portion 120 retains the second portion 52 of the first cable 50 and the fourth portion 64 of the second cable 60 so as not to disengage from the second end 122 of the second retaining portion 120.

Then, the second portion 52 of the first cable 50 and the fourth portion 64 of the second cable 60 are inserted between the second retaining portion 120 and the rear end face 312 of the second flat-cable retaining portion 312. At that time, the flexible portion 128 of the second retaining portion 120 is bent rearward. Bending of the flexible portion 128 may facilitate the insertion of the second portion 52 of the first cable 50 and the fourth portion 64 of the second cable 60 between the second retaining portion 120 and the rear end face 312. Thereafter, the restored flexible portion 128 retains the second portion 52 of the first cable 50 and the fourth portion 64 of the second cable 60 so as not to come out from between the second retaining portion 120 and the rear end face 312.

Thus, the retaining portion 100 retains the first portion 51 of the first cable 50 and the third portion 63 of the second cable 60 such that they have substantially U-shaped curves, which are curved downwardly. As depicted in FIG. 12A, when viewed from the left in the right-left direction, a lower end 51D of a substantially U-shaped curve in the first portion 51 and a lower end 63D of a substantially U-shaped curve in the third portion 63 are positioned directly above the turning portion 10K of the rear surface 10G. In other words, the lower end 51D of the first portion 51 and the lower end 63D of the third portion 63 are disposed so as not to overlap the control board C1 when viewed from above or below in the up-down direction.

<Detailed Structure of Groove Portion, Guide Wall and Inclined Surface>

As indicated in a double-dotted-and-dashed line in FIGS. 12A and 12B, the left cover 14 includes a groove portion 140, a guide wall 145, and an inclined surface 149 at the curved wall portion 14A.

The groove portion 140 may be a recess that is defined by an inner surface of the curved wall portion 14A and a rib 14R protruding from the inner surface of the curved wall portion 14A and is recessed downward. As depicted in FIG. 12A, when viewed from the right and left in the right-left direction, the rib 14R extends diagonally upward toward the front from a position of the inner surface of the curved wall portion 14A lower than the turning portion 10K of the rear surface 10G. The rib 14R further extends upward substantially perpendicularly. As depicted in FIG. 12B, the groove portion 140 extends substantially parallel to the right-left direction, i.e., the direction in which the first end 111 extends. The groove portion 140 includes a closed left end 141, which is positioned further to the left than the preventive portion 111H of the first retaining portion 110. The groove portion 140 includes an opened right end 142, which is adjacent to the left side surface of the first connecting portion 31 of the joint cover 30. That is, the groove portion 140 is disposed below the first end 111 of the first retaining portion 110.

As depicted in FIGS. 5, 12A, and 12B, the guide wall 145 may be a portion of the curved wall portion 14A of the left cover 14 and extend downward from a position where the right end 142 of the groove portion 140 is in contact with the curved wall portion 14A.

As depicted in FIG. 12A, the inclined surface 149 may be another portion of the curved wall portion 14A of the left cover 14 and be positioned higher than the turning portion 10K of the rear surface 10G. The inclined surface 149 extends diagonally downward to a position at which the inclined surface 149 faces the first end 111 of the first retaining portion 110 from below.

<Effects>

In the image reading apparatus 1 according to the illustrative embodiment, if liquid spills on the upper unit 40 while the upper unit 40 is closed as depicted in FIG. 1, liquid may come into the reading device 20 and/or the joint cover 30 from a gap between the upper unit 40 and the reading device 20 and/or a gap between the reading device 20 and the joint cover 30. If liquid spills on the upper surface of the reading device 20 while the upper unit 40 is opened as depicted in FIG. 3, liquid may come into the reading device 20 from a gap between the reading device 20 and the platen glass 29 and/or the opening 20H. In both of the cases, liquid may further run to the intermediate portion 50C of the first cable 50 and the intermediate portion 60C of the second cable 60.

As depicted in FIGS. 9, 10, and 12A, in the image reading apparatus 1, the first portion 51 of the intermediate portion 50C of the first cable 50 and the third portion 63 of the intermediate portion 60C of the second cable 60 are retained by the first retaining portion 110 and the second retaining portion 120 at the particular position spaced from and further to the rear than the control board C1 while the first portion 51 of the first cable 50 and the third portion 63 of the second cable 60 are curved in a substantially U-shape.

With this routing, if liquid runs on the first portion 51 of the first cable 50 and the third portion 63 of the second cable 60 from the intermediate portion 50C of the first cable 50 and the intermediate portion 60C of the second cable 60, respectively, liquid gathers at the lower end 51D of the substantially U-shaped curve in the first portion 51 and the lower end 63D of the substantially U-shaped curve in the third portion 63 and then drops therefrom. That is, in the image reading apparatus 1, liquid that runs on the first cable 50 and the second cable 60 may be eliminated at the lower end 51D of the first portion 51 and at the lower end 63D of the third portion 63, respectively.

Therefore, in the image reading apparatus 1 according to the illustrative embodiment, if liquid spills on the image reading apparatus 1, the above-described configuration may reduce or prevent liquid from reaching the control board C1 disposed inside the main device 10 and thus may reduce or prevent damage to the control board C1.

In the image reading apparatus 1, as depicted in FIGS. 9, 10, 11, and 12A, the lower end 51D of the first portion 51 and the lower end 63D of the third portion 63 are disposed so as not to overlap the control board C1 when viewed from above or below in the up-down direction. Therefore, if liquid gathering at the lower end 51D of the first portion 51 and at the lower end 63D of the third portion 63 drops down, liquid might not drop onto the control board C1.

In the image reading apparatus 1, as depicted in FIGS. 9, 10, and 12A, the intermediate portion 50C of the first cable 50 is retained by the first retaining portion 110 and the second retaining portion 120 while being curved twice between the first portion 51 and the second portion 52. Therefore, the portion between the first portion 51 and the second portion 52 may hardly disengage from the first retaining portion 110 and the second retaining portion 120. The intermediate portion 60C of the second cable 60 is retained by the first retaining portion 110 and the second retaining portion 120 while being curved twice between the third portion 63 and the fourth portion 64. Therefore, the portion between the third portion 63 and the fourth portion 64 may hardly disengage from the first retaining portion 110 and the second retaining portion 120. Therefore, both the first portion 51 of the first cable 50 and the third portion 63 of the second cable 60 may be kept curved in a substantially U-shape appropriately. Accordingly, in the image reading apparatus 1, liquid that runs the first cable 50 and the second cable 60 may be surely eliminated at the lower end 51D of the first portion 51 and at the lower end 63D of the third portion 63, respectively.

In the image reading apparatus 1, the preventive portion 111H of the first end 111 of the first retaining portion 110 may reduce or prevent the first portion 51 of the first cable 50 and the third portion 63 of the second cable 60 from disengaging from the first end 111 of the first retaining portion 110. The preventive portion 122H of the second end 122 of the second retaining portion 120 may reduce or prevent the second portion 52 of the first cable 50 and the fourth portion 64 of the second cable 60 from disengaging from the second end 122 of the second retaining portion 120.

In the image reading apparatus 1, the first portion 51 of the first cable 50 and the third portion 63 of the second cable 60 are disposed between the first retaining portion 110 and the wall portion 130 in the front-rear direction. Therefore, in the image reading apparatus 1, both the first portion 51 of the first cable 50 and the third portion 63 of the second cable 60 may be kept curved in a substantially U-shape appropriately.

In the image reading apparatus 1, the downwardly-extending portion of the second portion 52 of the first cable 50 and the downwardly-extending portion of the fourth portion 64 of the second cable 60 are retained by the second retaining portion 120 having a substantially plate-like shape extending in the up-down direction, so as not to move closer to the first portion 51 of the first cable 50 and the third portion 63 of the second cable 60. Accordingly, in the image reading apparatus 1, liquid gathering at the lower end 51D of the first portion 51 and at the lower end 63D of the third portion 63 might not run to the downwardly-extending portion of the second portion 52 and the downwardly-extending portion of the fourth portion 64.

In the image reading apparatus 1, as depicted in FIGS. 12A and 12B, when liquid gathering at the lower end 51D of the first portion 51 and at the lower end 63D of the third portion 63 drops down, the groove portion 140 of the curved wall portion 14A of the left cover 14 may receive and store the liquid therein.

In the image reading apparatus 1, the guide wall 145 of the curved wall portion 14A of the left cover 14 may downwardly direct the liquid collected in the groove portion 140 from the opened right end 142 of the groove portion 140 to the bottom of the main device 10.

In the image reading apparatus 1, when liquid gathering at the lower end 51D of the first portion 51 and at the lower end 63D of the third portion 63 drops down, the inclined surface 149 of the curved wall portion 14A of the left cover 14 may receive and direct dropped liquid toward the groove portion 140.

In the image reading apparatus 1, as depicted in FIGS. 5 and 13, if liquid spills on the image reading apparatus 1, liquid may run the rear surface 10G (e.g., a portion of an exterior surface of the image reading apparatus 1) to the first wall surface 181 of the recessed portion 180 of the rear surface 10G. If such a case happens, as depicted in FIG. 13, the groove 183 of the first wall surface 181 may cause liquid to drop before liquid reaches the second wall surface 182. Accordingly, the above-described configuration may reduce or prevent liquid from reaching the modem connector 99 exposed at the second wall surface 182.

In the image reading apparatus 1, the inclined first wall surface 181 and the upwardly-recessed groove 183 might not allow the user to inadvertently place the fingers thereon. Accordingly, the inclined first wall surface 181 and the upwardly-recessed groove 183 may reduce or prevent the user from carrying the image reading apparatus 1 through the recessed portion 180.

(Variation)

Figure 14:
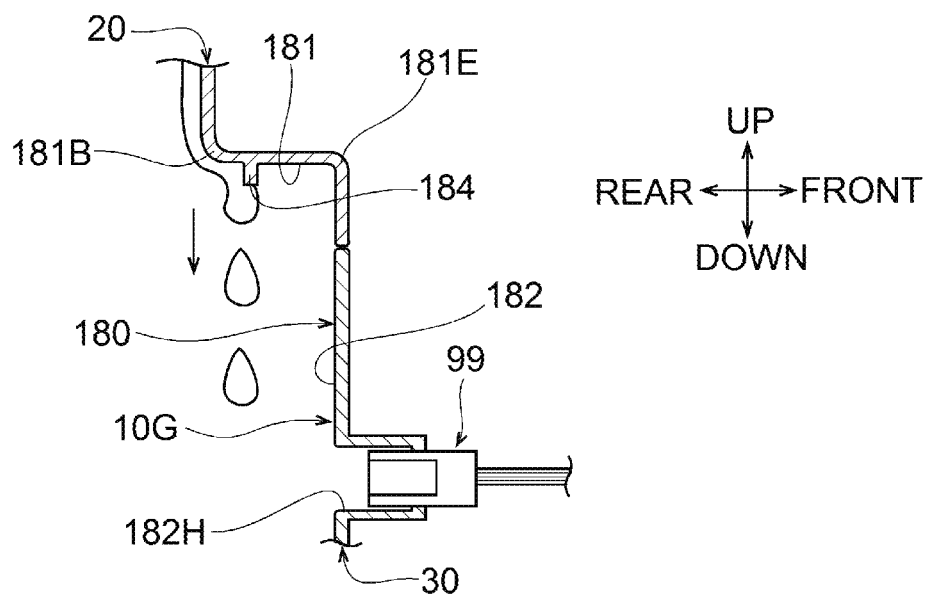
FIG. 14 is a cross sectional view similar to FIG. 13, depicting the first and second wall surfaces of the recessed portion, a rib, and the potential portion.

As depicted in FIG. 14, in an image reading apparatus according to a variation of the illustrative embodiment, the first wall surface 181 is bent from the rear surface 10G and extends substantially horizontally toward the inside of the main device 10. The first wall surface 181 includes a rib 184 protruding downward instead of the groove 183 of the illustrative embodiment. The rib 184 extends substantially parallel to the boundary line 181B between the vertical surface and the rear surface 10G and the first wall surface 181. The rib 184 has right and left ends that reach the right and left ends, respectively, of the first wall surface 181. The other configuration of the image reading apparatus is the same or similar to the configuration of the image reading apparatus 1 according to the illustrative embodiment.

In the image reading apparatus according to the variation, if liquid running the rear surface 10G reaches the first wall surface 181 of the recessed portion 180, the rib 184 of the first wall surface 181 may cause liquid to drop before liquid reaches the second wall surface 182. Accordingly, the above-described configuration may reduce or prevent liquid from reaching the modem connector 99 exposed at the second wall surface 182.

While the disclosure has been described in detail with reference to the specific embodiment thereof, this is merely an example, and various changes, arrangements and modifications may be applied therein without departing from the spirit and scope of the disclosure.

The disclosure may be applied to, for example, image reading apparatus or multifunction apparatus.

What is claimed is:

1. An image reading apparatus comprising:
   a reading device having an opening defined in an upper surface of the reading device, the reading device including a reading unit configured to read an image from a document and a drive unit configured to drive the reading unit, the reading unit and the drive unit being disposed below the upper surface of the reading device;
   a main device disposed below the reading device and including an electronic component;
   a first cable extending below the opening of the reading device, the first cable being connected at one end to the drive unit of the reading device and at another end to the electronic component of the main device, the first cable including a first portion;
   a retaining portion disposed in the main device and configured to retain the first cable at a position spaced from the electronic component, the retaining portion including:
   a first retaining portion adjacent to a side wall of the main device and including a first end portion at a lower end thereof, the first end portion being configured to contact the first portion of the first cable and to define a lower end of a substantially U-shaped curve in the first portion of the first cable, wherein the first end portion of the first retaining portion includes a preventive portion protruding downward; and
   a second retaining portion spaced from the first retaining portion, the second retaining portion including a second end portion at an upper end thereof, the second end portion being configured to contact a second portion of the first cable extending upward from the lower end of the substantially U-shaped curve in the first portion of the first cable such that the second portion has a substantially U-shaped curve, which is curved upwardly, and to define an upper end of the substantially U-shaped curve in the second portion of the first cable; and
   a groove portion disposed below the lower end of the substantially U-shaped curve in the first portion of the first cable retained by the first retaining portion, the groove portion being positioned to receive a liquid dropping down from the lower end of the substantially U-shaped curve in the first portion of the first cable.

2. The image reading apparatus according to claim 1, wherein the lower end of the substantially U-shaped curve in the first portion of the first cable, which is retained by the first retaining portion, is disposed so as not to overlap the electronic component of the main device in a vertical direction.

3. The image reading apparatus according to claim 1, wherein the first retaining portion extends in a vertical direction and has a substantially plate-like shape, and wherein the main device further includes a wall portion opposite to the second retaining portion relative to the first retaining portion, the wall portion extending in the vertical direction and having a substantially plate-like shape.

4. The image reading apparatus according to claim 1, wherein the second retaining portion extends in a vertical direction and has a substantially plate-like shape.

5. The image reading apparatus according to claim 1, wherein the groove portion is disposed along the side wall of the main device and below the first end portion of the first retaining portion, and extends substantially parallel to a direction in which the first end portion extends.

6. The image reading apparatus according to claim 5, wherein the side wall of the main device includes a guide wall, the guide wall being disposed adjacent to the groove portion and extending in a vertical direction.

7. The image reading apparatus according to claim 1, wherein the side wall of the main device includes an inclined surface extending downwardly to a position at which the inclined surface faces the first end portion of the first retaining portion.

8. The image reading apparatus according to claim 1, further comprising:
- an upper device disposed above the reading device and including a conveying unit configured to convey a sheet along a predetermined conveying path such that the reading unit reads an image from the sheet; and
- a second cable extending from the upper device through the opening of the reading device to the main device, the second cable being connected at one end to the conveying unit of the upper device and at another end to the electronic component of the main device, the second cable including a third portion,
- wherein the retaining portion is configured to further retain the third portion of the second cable such that the third portion has a substantially U-shaped curve, which is curved downwardly, and such that the liquid passes through the opening of the reading device, runs on the third portion downwardly and drops down from a lower end of the substantially U-shaped curve in the third portion of the second cable, and
- wherein the groove portion is disposed below the lower end of the substantially U-shaped curve in the third portion of the second cable retained by the retaining portion, and is positioned to further receive the liquid dropping down from the lower end of the substantially U-shaped curve in the third portion of the second cable.

9. The image reading apparatus according to claim 1,
- wherein the image reading apparatus further includes a specified side surface constituted of a side surface of at least one of the main device and the reading device, the specified side surface having a recessed portion that is recessed toward an inside of the main device,
- wherein the recessed portion includes a first wall surface and a second wall surface, the first wall surface extending diagonally downward toward the inside of the main device, the second wall surface extending below an end of the first wall surface spaced from the second wall surface,
- wherein the second wall surface is provided with a potential portion having a ground potential and being accessible from outside of the image reading apparatus, and
- wherein the first wall surface has a groove that is upwardly recessed relative to the first wall surface, the groove extending substantially parallel to a boundary line between the specified side surface and the first wall surface.

10. The image reading apparatus according to claim 1,
- wherein the image reading apparatus further includes a specified side surface constituted of a side surface of at least one of the main device and the reading device, the specified side surface having a recessed portion that is recessed toward an inside of the main device,
- wherein the recessed portion includes a first wall surface and a second wall surface, the first wall surface extending substantially horizontally toward the inside of the main device, the second wall surface extending below an end of the first wall surface spaced from the second wall surface,
- wherein the second wall surface is provided with a potential portion having a ground potential and being accessible from outside of the image reading apparatus, and
- wherein the first wall surface includes a rib protruding downward, the rib extending substantially parallel to a boundary line between the specified side surface and the first wall surface.

11. An image reading apparatus comprising:
- a reading device having an opening defined in an upper surface of the reading device, the reading device including a reading unit configured to read an image from a document and a drive unit configured to drive the reading unit, the reading unit and the drive unit being disposed below the upper surface of the reading device;
- a main device disposed below the reading device and including an electronic component;
- a cable extending below the opening of the reading device, the cable being connected at one end to the drive unit of the reading device and at another end to the electronic component of the main device;
- a retaining portion disposed in the main device and configured to retain a portion of the cable at a position spaced from the electronic component such that the retained portion has a substantially U-shaped curve, which is curved downwardly; and
- a groove portion disposed below a lower end of the substantially U-shaped curve in the retained portion of the cable retained by the retaining portion, the groove portion being positioned to receive a liquid dropping down from the lower end of the substantially U-shaped curve in the retained portion of the cable, a bottom surface of the groove portion being sloped.

12. The image reading apparatus of claim 11, wherein the bottom surface of the groove portion is sloped in a slope direction perpendicular to a direction in which a sheet is fed into the reading device.

13. The image reading apparatus of claim 11, wherein the groove portion is closed at one side in a sheet feeding direction, and open at another side in the sheet feeding direction.

14. The image reading apparatus of claim 13, wherein the retaining portion extends, in the sheet feeding direction, from a connecting portion side surface of the main device, and
- wherein the one side of the groove portion which is closed is a side of the groove portion on which the connecting portion side surface is disposed.

15. An image reading apparatus comprising:
- a reading device having an opening defined in an upper surface of the reading device, the reading device including:
  - a reading unit configured to read an image from a document, and
  - a drive unit configured to drive the reading unit, the reading unit and the drive unit being disposed below the upper surface of the reading device;
- a main device disposed below the reading device and including an electronic component;

a first retaining portion disposed adjacent to a side wall of the main device and including a first end portion at a lower end thereof;

a second retaining portion spaced from the first retaining portion by a predetermined distance, the second retaining portion including a second end portion at an upper end thereof, the second end portion being located above the first end portion of the first retaining portion;

a groove portion disposed below the first end portion of the first retaining portion, the groove portion including a bottom surface protruding from an inner surface of the side wall of the main device, and a vertical surface extending upward from the bottom surface and facing the inner surface; and a cable extending below the opening of the reading device, the cable being connected at one end to the drive unit of the reading device and at another end to the electronic component of the main device, the cable including a first portion, a second portion, and a third portion, wherein:

the first portion of the cable is retained by the first end portion of the first retaining portion such that the first portion has a substantially U-shaped curve, which is curved downwardly, the second portion of the cable is retained by the second end portion of the second retaining portion such that the second portion has a substantially U-shaped curve, which is curved upwardly from a lower end of the substantially U-shaped curve in the first portion of the cable, the third portion of the cable extends downwardly from an upper end of the substantially U-shaped curve in the second portion of the cable, and the vertical surface of the groove portion is disposed between the inner surface of the side wall of the main device and the third portion of the cable.

* * * * *